US 8,095,013 B2

(12) United States Patent
Ozeki et al.

(10) Patent No.: US 8,095,013 B2
(45) Date of Patent: Jan. 10, 2012

(54) STORAGE DEVICE, STORAGE DEVICE ARRAY, AND DATA PROCESSING SYSTEM

(75) Inventors: Shinobu Ozeki, Kanagawa (JP);
Yoshihide Sato, Kanagawa (JP);
Kazuhiro Suzuki, Kanagawa (JP);
Tsutomu Hamada, Kanagawa (JP);
Masaru Kijima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 752 days.

(21) Appl. No.: 12/195,796

(22) Filed: Aug. 21, 2008

(65) Prior Publication Data

US 2009/0196620 A1    Aug. 6, 2009

(30) Foreign Application Priority Data

Feb. 5, 2008   (JP) .................................. 2008-025126

(51) Int. Cl.
*H04B 10/24* (2006.01)
*H04B 10/10* (2006.01)
(52) U.S. Cl. .............................. 398/115; 398/164; 711/1
(58) Field of Classification Search .......... 398/115–117, 398/164; 711/1
See application file for complete search history.

(56) References Cited

U.S. PATENT DOCUMENTS

2002/0023198 A1   2/2002   Kokubun et al.
2005/0259993 A1*  11/2005  Davies et al. ................. 398/164

FOREIGN PATENT DOCUMENTS

| JP | 03-027432 | 2/1991 |
| JP | 2002-24071 | 1/2002 |
| JP | 2002-353895 | 12/2002 |
| JP | 2007-004271 | 1/2007 |
| JP | 2007-304779 | 11/2007 |
| WO | 2005/119463 | 12/2005 |

* cited by examiner

*Primary Examiner* — Leslie Pascal
(74) *Attorney, Agent, or Firm* — Fildes & Outland, P.C.

(57) ABSTRACT

A storage device includes a storage section, a first control section, a communication section, a second control section and a wireless transmission and reception section. The storage section stores data. The first control section controls reading and writing the data from and into the storage section. The communication section transmits and receives the data to and from a higher-level device via a first transmission line. The second control section transmits and receives the data to and from the first control section and the communication section. The wireless transmission and reception section is provided to face a predetermined direction, and wirelessly transmits and receives data to and from another storage device provided in the predetermined direction under control of the second control section.

15 Claims, 14 Drawing Sheets

*OB: OPTICAL BRANCH SECTION

200# STORAGE DEVICE, STORAGE DEVICE ARRAY, AND DATA PROCESSING SYSTEM

CROSS-REFERENCE TO RELATED APPLICATIONS

This application is based on and claims priority under 35 USC 119 from Japanese Patent Application No. 2008-25126 filed Feb. 5, 2008.

BACKGROUND

Technical Field

The invention relates to a storage device, a storage device array, and a data processing system.

SUMMARY

According to an aspect of the invention, a storage device includes a storage section, a first control section, a communication section, a second control section and a wireless transmission and reception section. The storage section stores data. The first control section controls reading and writing the data from and into the storage section. The communication section transmits and receives the data to and from a higher-level device via a first transmission line. The second control section transmits and receives the data to and from the first control section and the communication section. The wireless transmission and reception section is provided to face a predetermined direction, and wirelessly transmits and receives data to and from another storage device provided in the predetermined direction under control of the second control section.

BRIEF DESCRIPTION OF THE DRAWINGS

Exemplary embodiments of the invention will be described in detail based on the following figures, wherein.

DETAILED DESCRIPTION

First Exemplary Embodiment

Figure 1:
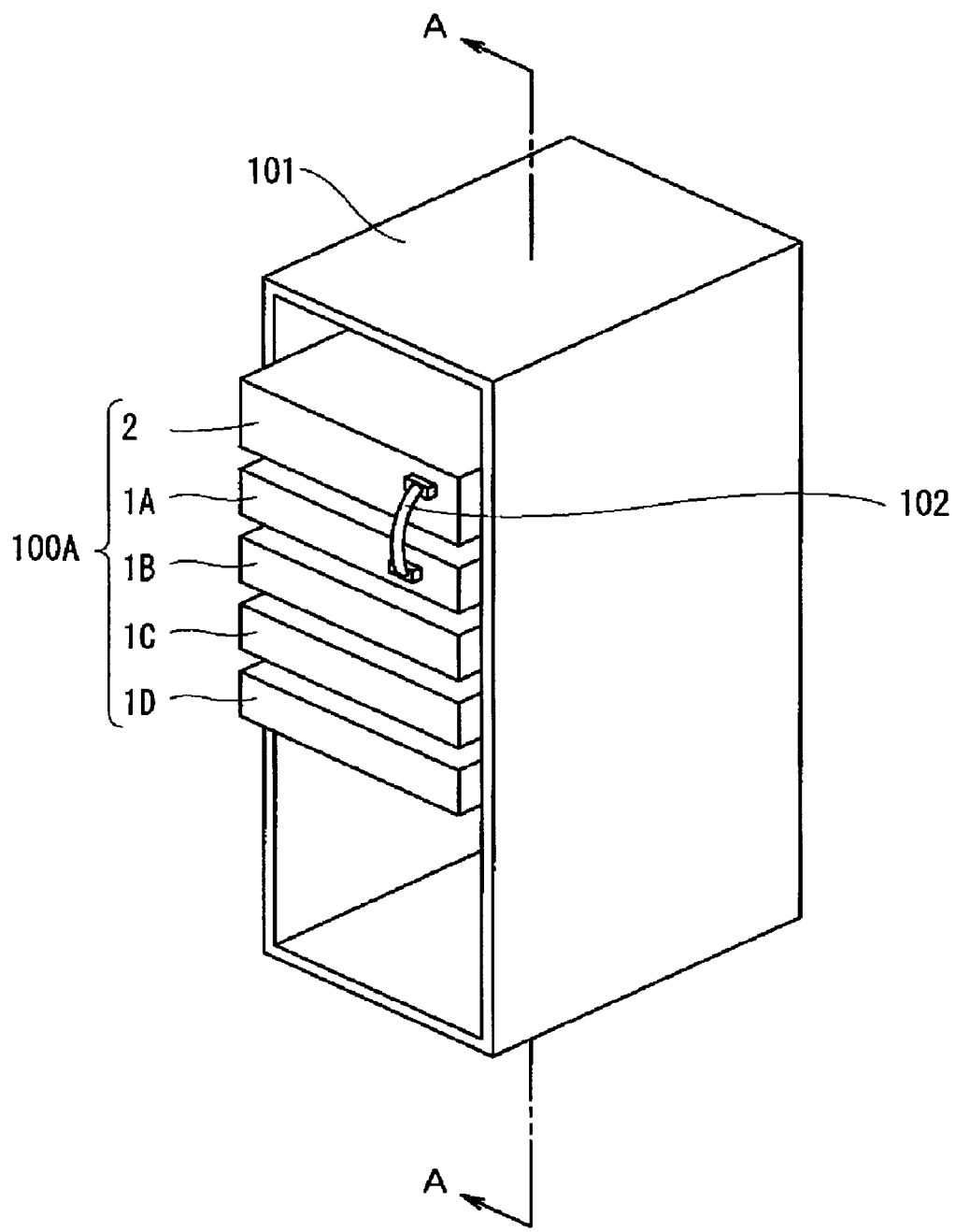
FIG. 1 is a perspective view showing one example of the schematic configuration of a data processing system according to a first exemplary embodiment of the invention.
Figure 2:
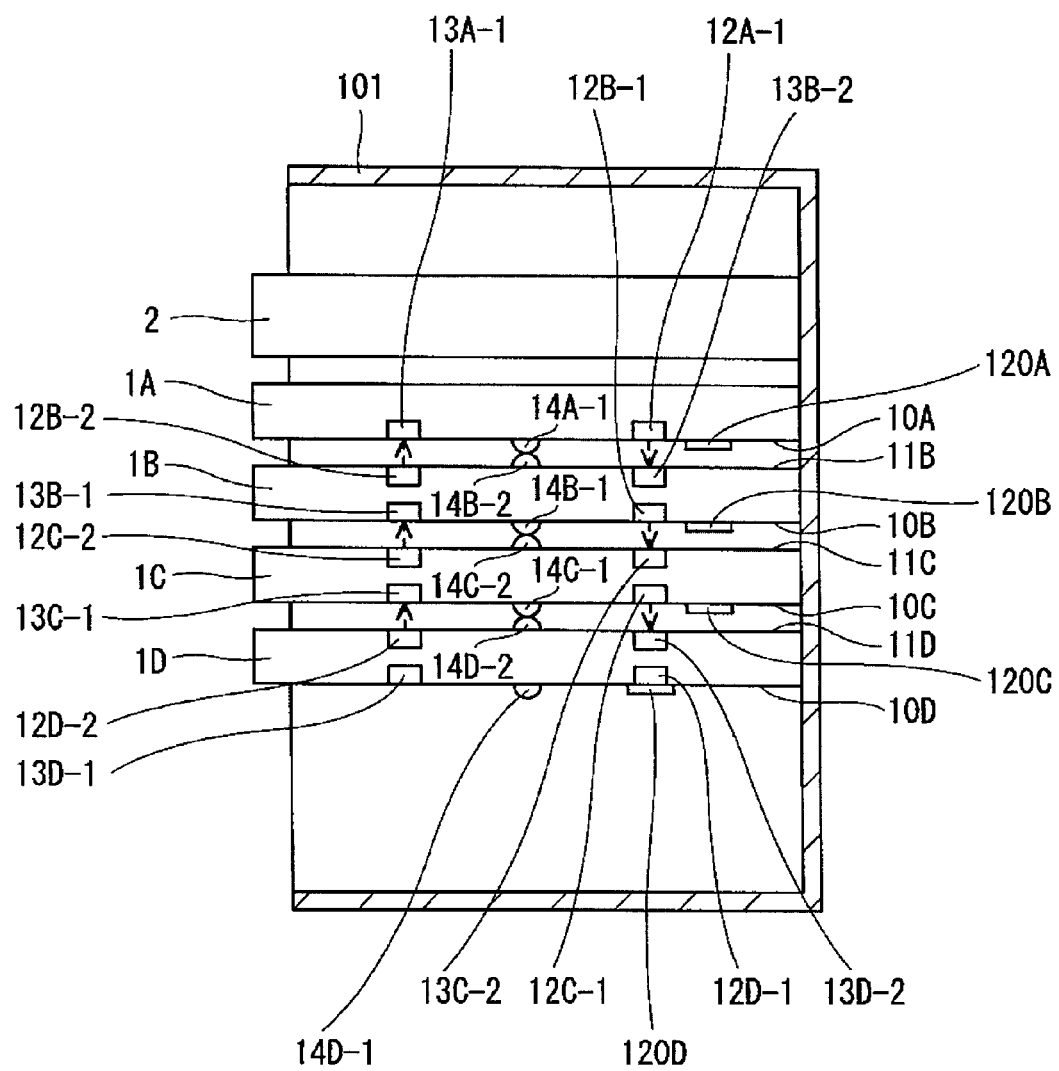
FIG. 2 is a section view taken along a line A-A in FIG. 1.

FIG. 1 is a perspective view showing one example of the schematic configuration of a data processing system according to a first exemplary embodiment of the invention. FIG. 2 is a section view taken along the line A-A of FIG. 1.

The data processing system 100A is housed in a box-like rack 101 that is opened at one side surface thereof. The data processing system 100A includes a host 2 provided in the upper portion of the rack 101, and first to fourth storage devices 1A to 1D that are detachably provided below the host 2.

The rack 101 houses the host 2 and the first to fourth storage devices 1A to 1D with the host 2 and the first to fourth storage devices 1A to 1D being arranged vertically. The rack 101 is configured so as to allow addition, removal, or exchange of the first to fourth storage devices 1A to 1D. Also, the width of the rack 101 is, for example, 19 inches based on the standard of JIS, EIA, or the like.

(Host)

The host 2 is a higher-level device for processing data, with respect to the first to fourth storage devices 1A to 1D. The host 2 requests the first storage device 1A to write and/or read data, or to perform another operation. Such a host 2 may be implemented, for example, by a server, a computer (PC), a work station (WS), or the like.

Also, the host 2 is connected to the first storage device 1A via a cable 102, and transmits and receives data to and from the first storage device 1A according to the interface standard such as the serial ATA, SAS, fiber channel, Infiniband, PCI, Express, IDE, or SCSI.

The cable 102 may be an optical line or an electric line. The cable 102 may also be provided on a different side surface (e.g., the opposite side surface) from the opened side surface of the rack 101. Furthermore, the host 2 may be connected to a communication network such as local area network of wire LAN, wireless LAN, or the like, or the Internet, for transmission and reception of data to and from another host.

(Storage Devices)

The first to fourth storage devices 1A to 1D are housed sequentially from above in the rack 101, so that data are transmitted and received through wireless communication among the vertically adjacent storage devices 1A to 1D. The wireless communication includes communication through electromagnetic waves such as light and radio wave with a wavelength longer than that of light, communication using electromagnetic induction, or the like. In this exemplary embodiment, transmission and reception of data through light will be described.

In the data processing system 100A shown in FIG. 1, the four storage devices 1A to 1D are provided as a storage device array. However, the number of storage devices is not limited to four, and it may be two, three, five or more.

Each of the first to fourth storage devices 1A to 1D includes, for example, a plate-like casing having a predetermined thickness. Also, the first to fourth storage devices 1A to 1D have bottom surfaces 10A to 10D and the top surfaces 11B to 11D of the casings.

The bottom surfaces 10A to 10D are provided on the downstream device side with respect to the storage devices 1A to 1D, respectively. In the bottom surfaces 10A to 10D, optical transmission sections (wireless transmission sections) 12A-1 to 12D-1, optical reception sections (wireless reception sections) 13A-1 to 13D-1, and contact members 14A-1 to 14D-1 are provided, respectively.

The top surfaces 11B to 11D are provided on the upstream device side with respect to the storage devices 1B to 1D, respectively. In the top surfaces 11B to 11D, optical transmission sections 12B-2 to 12D-2, optical reception sections 13B-2 to 12D-2, and contact members 14B-2 to 14D-2 are provided, respectively. For example, the downstream device with respect to the second storage device 1B is the third storage device C, and the higher-level device with respect to the second storage device 1B is the first storage device 1A.

The optical transmission sections 12A-1 to 12D-1 on the bottom surfaces 10A to 10D are provided to face a direction of the downstream device side, and transmit optical signals to the counterpart downstream devices, respectively. The optical transmission sections 12B-2 to 12D-2 on the top surfaces 11B to 11D are provided to face a direction opposite to the direction of the downstream device side, that is, a direction of the upstream device side. The optical transmission sections 12B-2 to 12D-2 transmit optical signals to the counterpart upstream devices, respectively.

Also, the optical transmission sections 12A-1 to 12D-1 include shutters 120A to 120D for blocking optical signals, respectively. For the shutters 120A to 120D, when a downstream device is not disposed, a shutter (120A to 120D) is brought in a close state (see the shutter 120D of the fourth storage device 1D in the figure) to block an optical signal from the optical transmission section 12D-1. Also, when a downstream device is disposed, a shutter (120A to 120D) is brought in an open state (see the shutters 120A to 120C of the first to third storage devices 1A to 1C in the figure) to allow optical signals to be transmitted from the optical transmission sections 12A-1 to 12C-1.

The optical reception sections 13A-1 to 13D-1 on the bottom surfaces 10A to 10D are provided to face a direction of the downstream device side to receive optical signals from the counterpart downstream devices, respectively. Also, the optical reception sections 13B-2 to 13D-2 on the top surfaces 11B to 11D are provided to face a direction of the upstream device side to receive optical signals from the counterpart upstream devices, respectively.

When a downstream device is disposed at a predetermined position in which the storage device corresponding to each of the contact members 14A-1 to 14A-3 can transmit and receive data to from the downstream device, each of the contact members 14A-1 to 14A-3 provided on the bottom surface (10A to 10D) come in contact with the counterpart contact member (14B-2 to 14D-2) provided at the opposing position.

Then, a detection circuit (not shown) detects the contact by an electric method through energization or the like. The method for detecting as to whether or not a downstream device is disposed at a predetermined position may be a physical method by a sensor, a switch, or the like.

When the contact members 14A-1 to 14A-3 and the contact members 14B-2 to 14D-2 are in contact with each other, respectively, the optical transmission sections 12A-1 to 12C-1 and the optical reception sections 13B-2 to 13D-2 are disposed in positions where they face each other, respectively, and the optical transmission sections 12B-2 to 12D-2 and the optical reception sections 13A-2 to 13C-2 are disposed in positions where they face each other, respectively. Thereby, it becomes possible to transmit and receive data through optical signals between the adjacent storage devices 1A to 1D. In this case, an optical signal transmitted from the optical transmission section to the optical reception section disposed in a position opposite to the optical transmission section propagates through a space therebetween.

Thus, by establishing a connection between the adjacent storage devices 1A to 1D using optical signals, the system is adaptable to hot swap (hot plug) in which a current-carrying storage device is connected with another storage devices still in a current carrying state without considering factors for electrical connection, such as the through current and differences in signal level.

In FIG. 1, the first to fourth storage devices 1A to 1D are sequentially arranged from above. However, any arrangement is acceptable so long as data can be transmitted and received between the adjacent storage devices 1A to 1D. For example, the first to fourth storage devices 1A to 1D may be sequentially arranged from below. Alternatively, the first to fourth storage devices 1A to 1D may be arranged from side to side in the rack 101. Also, the optical transmission sections 12A-1 to 12D-1 and 12B-2 to 12D-2 may be provided in any positions inside or outside of the housing so long as they are provided in positions where optical signals can be transmitted toward the counterpart optical reception sections. Furthermore, similarly, the optical reception sections 13A-1 to 13D-1 and 13B-2 to 13D-2 may be provided in any positions inside or outside of the housing so long as they are provided in positions where optical signals can be received from the counterpart optical transmission sections.

Figure 3:
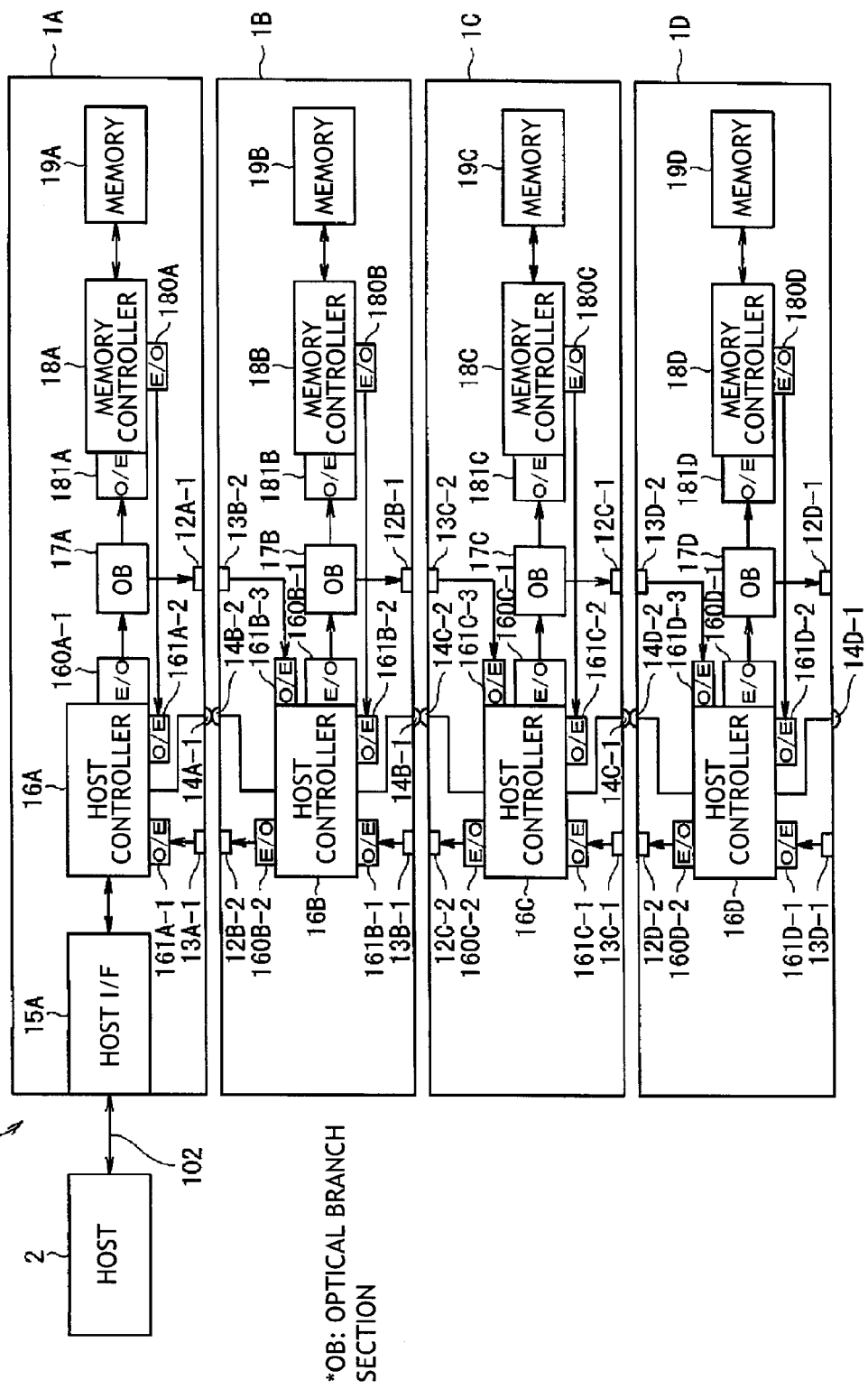
FIG. 3 is a block diagram showing one example of the schematic configuration of the data processing system according to the first exemplary embodiment of the invention.

FIG. 3 is a block diagram showing one example of the schematic configuration of the data processing system according to the first exemplary embodiment of the invention.

The first storage device 1A includes a host interface (I/F) 15A, a host controller 16A, an optical branch section 17A, a memory controller 18A, and a memory 19A as well as the optical transmission section 12A-1, the optical reception section 13A-1, and the contact member 14A-1.

The second storage device 1B includes a host controller 16B, an optical branch section 17B, a memory controller 18B, and a memory 19B as well as the two optical transmission sections 12B-1 and 12B-2, the two optical reception sections 13B-1 and 13B-2, and the two contact members 14B-1 and 14B-2.

The third and fourth storage devices 1C and 1D are configured in a similar manner to the second storage device 1B. Therefore, in the following description of the configuration, the second storage device 1B will be described. Also, the host I/F 15A is an example of a communication section, the host controllers 16A to 16D are examples of a second control section, and the memory controllers 18A to 18D are examples of a first control section.

(Configuration of Respective Sections of First Storage Device)

The host I/F 15A controls transmission and reception of data to and from the host 2 and the host controller 16A.

The host controller 16A controls transmission and reception of data to and from the host I/F 15A, the memory controller 18A, and the second storage device 1B.

Figure 4A:
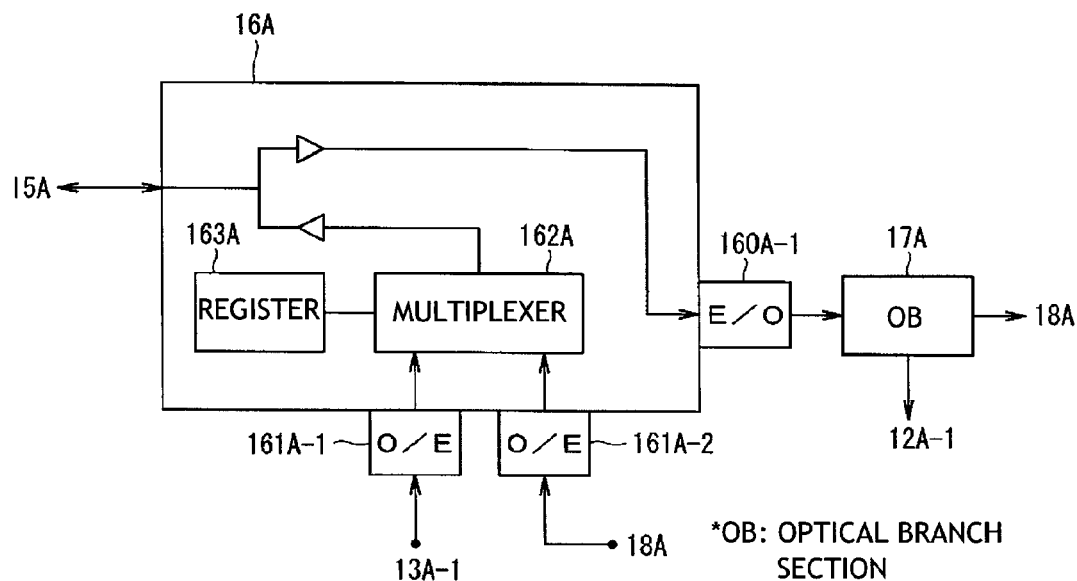
FIG. 4A is a block diagram showing one example of the schematic configuration of the inside of a host controller provided in a first storage device.

FIG. 4A is a block diagram showing one example of the schematic configuration of the inside of the host controller 16A. The host controller 16A includes an E/O (electro-optic conversion section) 160A-1, O/Es (optic-electro conversion sections) 161A-1 and 161A-2, a multiplexer 162A and a register 163A (an example of a storage circuit). When the host controller 16A transmits data received from the host I/F 15A to the memory controller 18A and the second storage device 1B, the E/O 160A-1 converts an electric signal as the data into a optical signal. The O/Es 160A-1 and 161A-2 convert optical signals transmitted from the second storage device 1B and the memory controller 18A into electric signals, respectively. The multiplexer 162A temporally multiplexes the two electric signals received via the O/Es 161A-1 and 161A-2 and outputs the multiplexed signal as one electric signal. The register 163A stores control information regarding another storage device (other storage devices; 1B to 1D) connected to the first storage device 1A.

When it is detected by the contact member 14A-1 (an example of the detection section) and the detection circuit that the second storage device 1B is disposed in the predetermined position, the host controller 16A changes the state of the shutter 120A into the open state and starts transmission of optical signals from the optical transmission section 12A-1.

Also, when the host controller 16A receives via the optical reception section 13A-1 an initialization request signal which has a predetermined pattern and is transmitted from the second storage device 1B, the host controller 16A performs an initialization process for starting transmission and reception of data between the host controller 16A and the downstream device.

In the initialization process, the host controller 16A acquires device information regarding another storage device (other storage devices; 1B to 1D). Then, based on the device information, the host controller 16A determines time slot allocation in which segment time slots obtained by dividing a predetermined time period by a division number equal to or larger than the total number of the storage devices including its own storage device (the storage device corresponding to the host controller 16A) and the other storage devices are allocated to the respective storage devices 1A to 1D. Then, the host controller 16A transmits the time slot allocation information indicating the time slot allocation to the other storage devices 1B to 1D. The division number may be appropriately changed according to the total number of the storage devices or be determined in advance.

The device information may include the storage capacities of the memories 19A to 19D provided in the storage devices 1A to 1, the processing speeds of the host controllers 16A to 16D, and/or the like. Also, as well as the device information, the control information stored in the register 163A includes, as information acquired through the initialization process, for example, (i) rank information indicating where its own storage device is located in order of the storage devices of the storage device array from the upstream side and (ii) the time slot allocation information indicating the time slot allocation determined by the initialization process. Then, when arrangement of the downstream devices is changed by, for example, adding a downstream device or removing any of the downstream devices, the control information is updated based on the changed arrangement of the downstream devices.

The host controller 16A allocates data received from the second storage device 1B and data received from the memory controller 18A to segment time slots based on the time slot allocation, to thereby perform time division multiplexing, and transmits the resultant multiplex data in the upstream direction toward the host I/F 15A.

Also, in order to judge as to whether or not it is possible to continuously transmit and receive data to and from the downstream device, the host controller 16A performs a connection confirmation process for transmitting a connection maintaining signal having a specific pattern to the downstream device and periodically confirming if the host controller 16A receives a connection maintaining signal transmitted from the downstream device. Then, when the host controller 16A has not received the connection maintaining signal for a given period, the host controller 16A recognizes that, for example, the second storage device 1B has been removed or that a trouble has occurred in transmission and reception of data. Thus, the host controller 16A stops transmitting and receiving data to and from the second storage device 1B. In this case, the host controller 16A changes the state of the shutter 120A to the close state to block an optical signal from the optical transmission section 12A-1.

The memory controller 18A controls writing and reading of data to and from the memory 19A, based on data transmitted from the host controller 16A.

Also, the memory controller 18A includes an E/O 180A and an O/E 181A. When the memory controller transmits data as an electric signal read from the memory 19A to the host controller 16A, the E/O 180A converts the electric signal (data) into an optical signal. The O/E 181A converts an optical signal transmitted from the host controller 16A into an electric signal.

In order to make the mark ratio (ratio of 0 and 1) of the transmission signal be close to 50%, for example, the 8 B/10 B conversion technology for encoding from 8 bits into 10 bits may be applied to the data to be subjected to transmission and reception between the host controller 16A and the memory controller 18A. Also, a transmission line extending from the memory controller 18A to the host controller 16A may be an electric line. In that case, the O/E 161A-2 and the E/O 180A are unnecessary.

The memory 19A is an example of a storage section for storing data. Data is written and read to and from the memory 19A via the memory controller 18A. For the memory 19A, for example, a volatile semiconductor memory such as a DRAM, or a nonvolatile semiconductor memory such as a flush memory is suitable. Also, the memory 19A may be a magnetic hard disk or an optical disk such as a DVD.

The optical branch section 17A has a function of branching one optical signal on an input side to output plural optical signals to an output side. For example, the optical branch section 17A may be formed of a sheet-like optical waveguide (optical sheet bus) or an optical coupler. Therefore, the optical branch section 17A branches an optical signal transmitted from the E/O 160A-1, and transmits the branched signal to the memory controller 18A and the optical transmission section 12A-1. Also, a transmission line for branching an optical signal transmitted from the E/O 160A-1 by the optical branch section 17A and for transmitting the branched signals to the memory controller 18A and the optical transmission section 12A-1 constitutes an optical branch line.

Figure 5A:
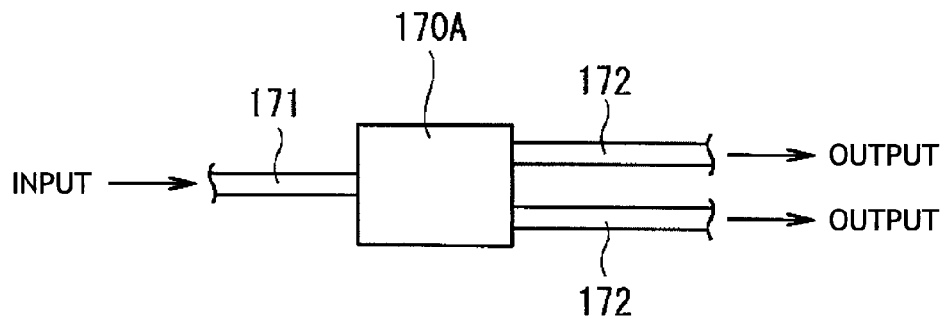
FIG. 5A is a section view of a sheet-like optical waveguide.
Figure 5B:
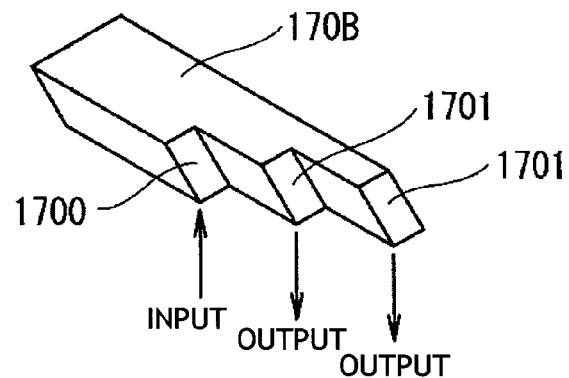
FIG. 5B is a perspective view of the stepwise sheet-like optical waveguide.
Figure 5C:
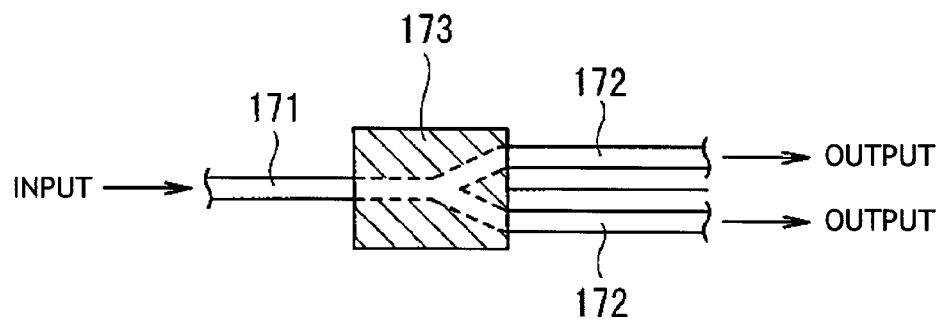
FIG. 5C is a section view of an optical coupler.

FIGS. 5A to 5C are views each showing an example of the configuration of the optical branch section. A sheet-like optical waveguide 170A shown in FIG. 5A is in the form of a sheet-like light guide path, and uniformly diffuses light incident (input) from an optical fiber 171, and outputs the diffused light to two optical fibers 172. The sheet-like optical waveguide 170A includes a sheet-like transparent medium with a uniform thickness, and it is made of, for example, a plastic material such as polymethyl methacrylate, polycarbonate, or amorphous polyolefin, or inorganic glass.

FIG. 5B shows a stepped sheet-like optical waveguide 170B. The sheet-like optical waveguide 170B is made of the same material as that of the sheet-like optical waveguide 170A. The stepped sheet-like optical waveguide 170B uniformly diffuses light incident from the incident side 1700 having 45 degrees, and outputs two light rays from the output side 1701 having 45 degrees.

FIG. 5C shows an optical coupler 173. The optical coupler 173 is a light guide path having a Y-shaped core, and branches light incident from the optical fiber 171, and outputs the branched light to two optical fibers 172.

(Configuration of the Respective Sections of the Second Storage Device)

The host controller 16B controls transmission and reception of data to and from the memory controller 18B, the first storage device 1A, and the third storage device 1C.

Figure 4B:
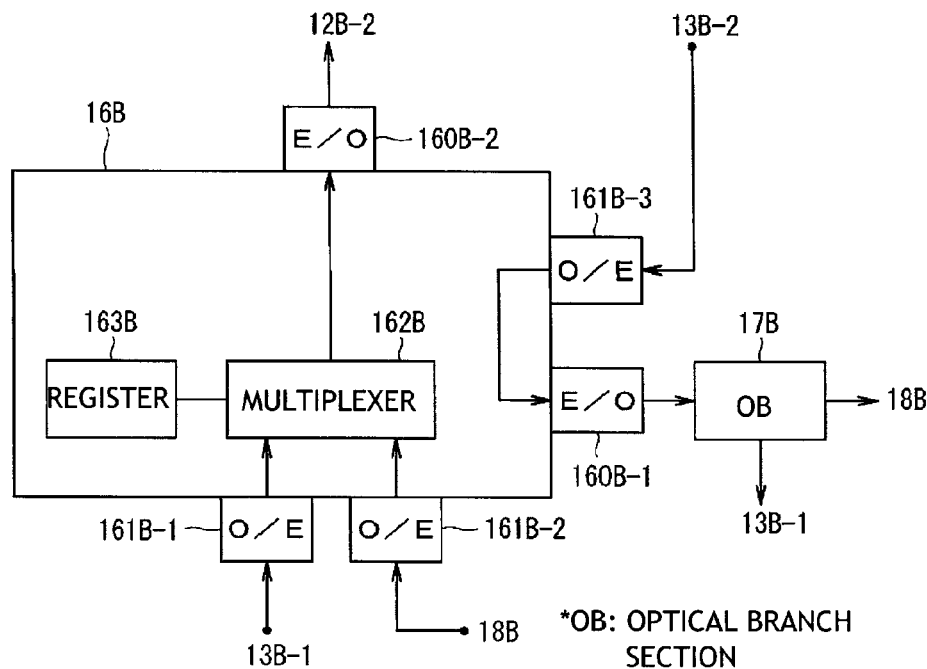
FIG. 4B is a block diagram showing one example of the schematic configuration of the inside of a host controller provided in a second storage device.

FIG. 4B is a block diagram showing one example of the schematic configuration of the inside of the host controller 16B. Namely, the host controller 16B includes an E/O 160B-1, an E/O 160B-2, O/Es 161B-1, 161B-2, 161B-3, a multiplexer 162B, and a register 163B. The E/O 160B-1 converts an electric signal to be transmitted to the memory controller 18B and the third storage device 1C into an optical signal. The E/O 160B-2 converts an electric signal to be transmitted to the first storage device 1A into a optical signal. The O/Es 161B-1, 161B-2, and 161B-3 convert optical signals transmitted from the third storage device 1C, the memory controller 18B, and the first storage device 1A into electric signals, respectively. The multiplexer 162B performs time division multiplexing based on the determined time slot allocation. The register 163B stores the control information or the like.

Similarly to the host controller 16A, the host controller 16B performs a process for starting transmission of an optical signal when the downstream device is detected, an initialization process with the upstream device and the downstream device, a connection confirmation process for stopping to transmit and receive data to and from the downstream device and the upstream device based on a connection maintaining signal, and the like. The optical branch section 17B, the memory controller 18B, and the memory 19B are similar to the optical branch section 17A, the memory controller 18A, and the memory 19A which are provided in the first storage device 1A, respectively. Therefore, description thereon will be omitted.

In the connection confirmation process, the host controller 16B transmits connection maintaining signals to the upstream device and the downstream device, and periodically confirms if the host controller 16B has received connection maintaining signals transmitted from the upstream device and the downstream device.

Then, when the host controller 16B has not received a connection maintaining signal from the downstream device for a given period, the host controller 16B stops transmitting and receiving data to and from the downstream device. In this case, the host controller 16B changes the state of the shutter 120B into the close state to block an optical signal from the optical transmission section 12B-1. Also, when the host controller 16B has not received a connection maintaining signal from the upstream device for a given period, the host controller 16B stops transmitting and receiving data with the upstream device. In this case, the host controller 16B controls the E/O 160B-2 to stop transmitting an optical signal from the transmission section 12B-2. Also, the following configuration may be adopted: a shutter is provided for the transmission section 12B-2, so that an optical signal from the transmission section 12B-2 is blocked by the shutter.

Operation in First Exemplary Embodiment

Then, description will be given to one example of the operation of the data processing system 100A according to first exemplary embodiment.

(1) Initialization Process between Storage Devices

Figure 6:
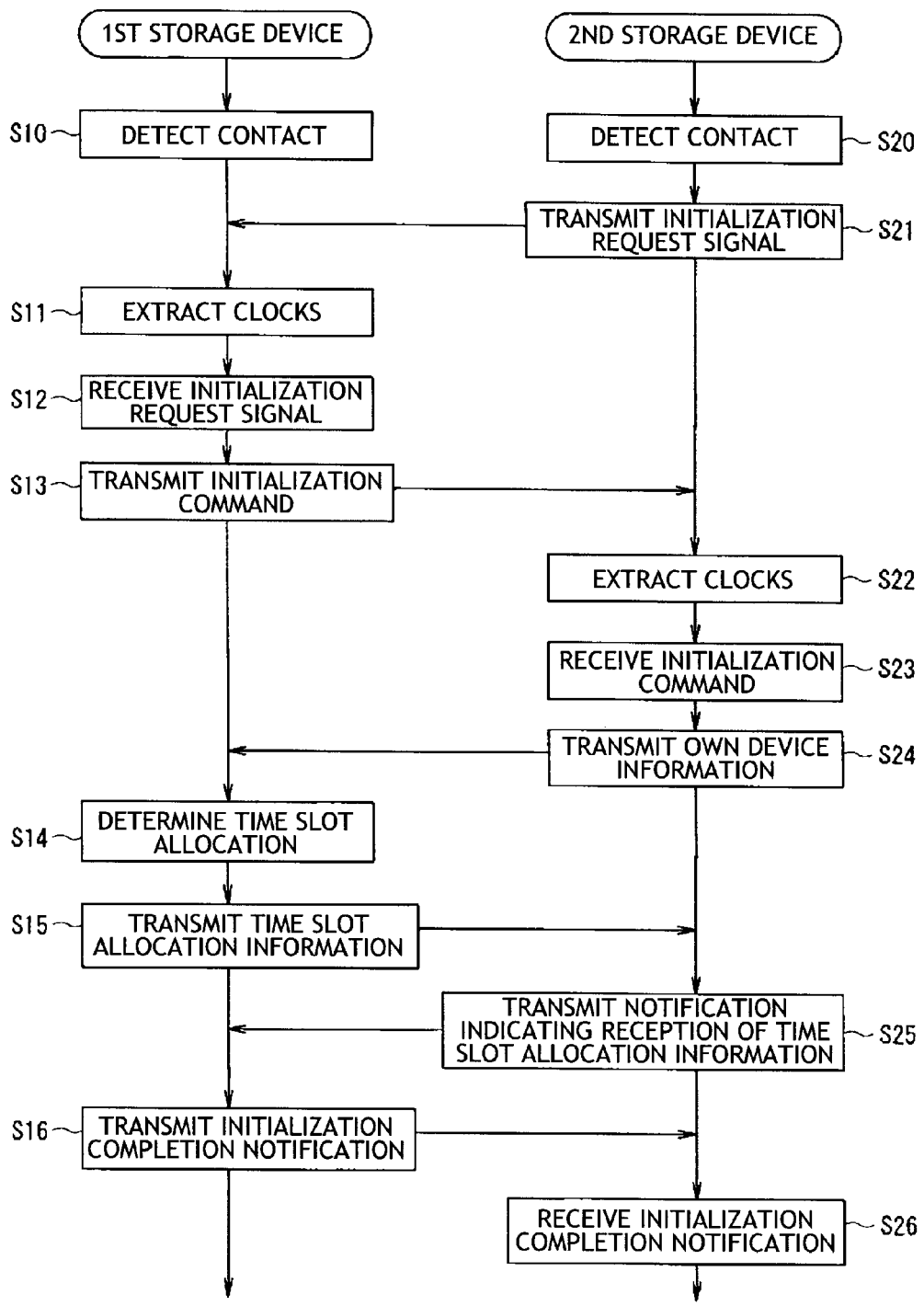
FIG. 6 is a flowchart showing one example of the operation of the data processing system according to the first exemplary embodiment of the invention.

The initialization process between the storage devices will be described with reference to a flowchart shown in FIG. 6. The case where the second storage device 1B is added below the first storage device 1A in a state in which the host 2A and the first storage device 1A are housed in the rack 101 and in which data is being transmitted and received between the host 2A and the first storage device 1A will be described.

First, when the second storage device 1B is disposed in a predetermined position in the rack 101 and when a power source of the second storage device 1B is turned on, the contact member 14B-2 comes into contact with the contact member 14A-1 provided in the first storage device 1A, and the detection circuit detects this contact (S20).

Then, the host controller 16B is notified of the fact that the contact has been detected by the detection circuit. Then, the host controller 16B converts an initialization request signal having a specific pattern into an optical signal by the E/O 161B-2, and transmits the converted optical signal to the first storage device 1A via the optical transmission section 12B-2 (S21). The specific pattern is, for example, a combination of K characters of 8B10B codes, and the initialization request signal is configured so that clocks can be extracted from its specific pattern.

On the other hand, in the host controller 16A of the first storage device 1A, similarly the contact member 14A-1 comes into contact with the contact member 14B-2, and the detection circuit detects this contact (S10). Then, the host controller 16A comes in a standby state for reception of the initialization request signal via the optical reception section 13A-1.

Then, when the host controller 16A receives the optical signal transmitted from the second storage device 1B via the optical reception section 13A-1 at the step S21, the host controller 16A converts the optical signal into an electric signal by the O/E 161A-1, and extracts clocks from the converted electric signal (S11).

Then, the host controller 16A recognizes the specific pattern from the electric signal, to thereby receive the initialization request from the second storage device 1B (S12).

Then, the host controller 16A converts an initialization command having a specific pattern different from the initialization request signal into an optical signal by the E/O 160A-1, and transmits the converted optical signal to the second storage device 1B via the optical branch section 17A and the optical transmission section 12A-1 (S13). At this time, the shutter 120A has been brought into the open state from the close state in accordance with a command from the host controller 16A.

Then, when the host controller 16B receives the transmitted optical signal via the optical reception section 13B-2, the host controller 16B converts the optical signal into an electric signal by the O/E 161B-3 and extracts clocks from the converted electric signal (S22).

Then, the host controller 16B recognizes the specific pattern from the electric signal, to thereby receive the initialization command from the first storage device 1A (S23).

Then, the host controller 16B having received the initialization command transmits its own device information (device information of the second storage device 1B) to the first storage device 1A (S24).

Then, when the host controller 16A receives the transmitted device information, the host controller 16A determines the time slot allocation for transmission and reception of data between the host controller 16A and the host controller 16B (S14). Then, the host controller 16A transmits the rank information indicating that the second storage device 1B is the second storage device together with the time slot allocation information indicating the determined time slot allocation, to the second storage device 1B (S15).

Then, when the host controller 16B receives the time slot allocation information and the rank information, the host controller 16B stores the time slot allocation information and the rank information in the register 163B, and transmits to the first storage device 1A a reception notification indicating that the host controller 16B has received those information (S25).

Then, when the host controller 16A receives the reception notification, the host controller 16A transmits completion notification indicating completion of the initialization (S16). The host controller 16B receives the completion notification (S26), to thereby complete the initialization process.

In the manner described above, the first and second storage devices 1A and 1B, which have completed the initialization process, start transmitting and receiving data between the storage devices 1A and 1B.

Also, when the third storage device 1C is added below the second storage device 1B, an initialization request signal is transmitted from the third storage device 1C to the second storage device 1B. The second storage device 1B performs the same initialization process (first time) as that described above between the second storage device 1B and the third storage device 1C.

Thereafter, an initialization request signal is transmitted from the second storage device 1B to the first storage device 1A, and the first storage device 1A performs an initialization process (second time) between the first storage device 1A and the second storage device 1B. Then, transmission and reception of data are started among the three storage devices 1A to 1C. In the second initialization process, the second storage device 1B transmits not only its own device information but also device information regarding the third storage device 1C, which is the downstream device, to the first storage device 1A.

Furthermore, similarly, when the fourth storage device 1D is added blow the third storage device 1C, initialization processes are successively performed among the downstream devices. Finally, the first storage device 1A performs an initialization process between the first storage device 1A and the second storage device 1B. Then, transmission and reception of data are started among the four storage devices 1A to 1D.

In the manner described above, the information of the second to fourth storage devices 1B to 1D, which are arranged as the downstream devices, are collected in the first storage device 1A. Therefore, the host 2 can handle the plural storage devices 1A to 1D as a single storage device.

(2) Data Transmission among the Storage Devices

Figure 7B:
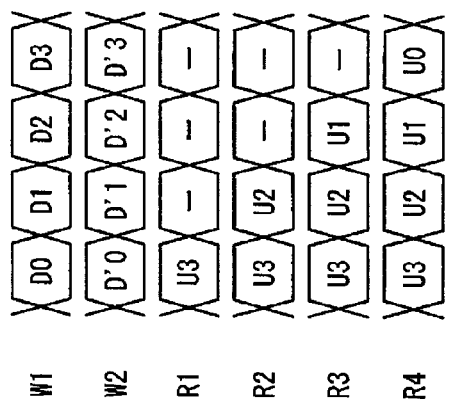
FIG. 7B is a view showing details of the data transmitted and received.
Figure 7A:
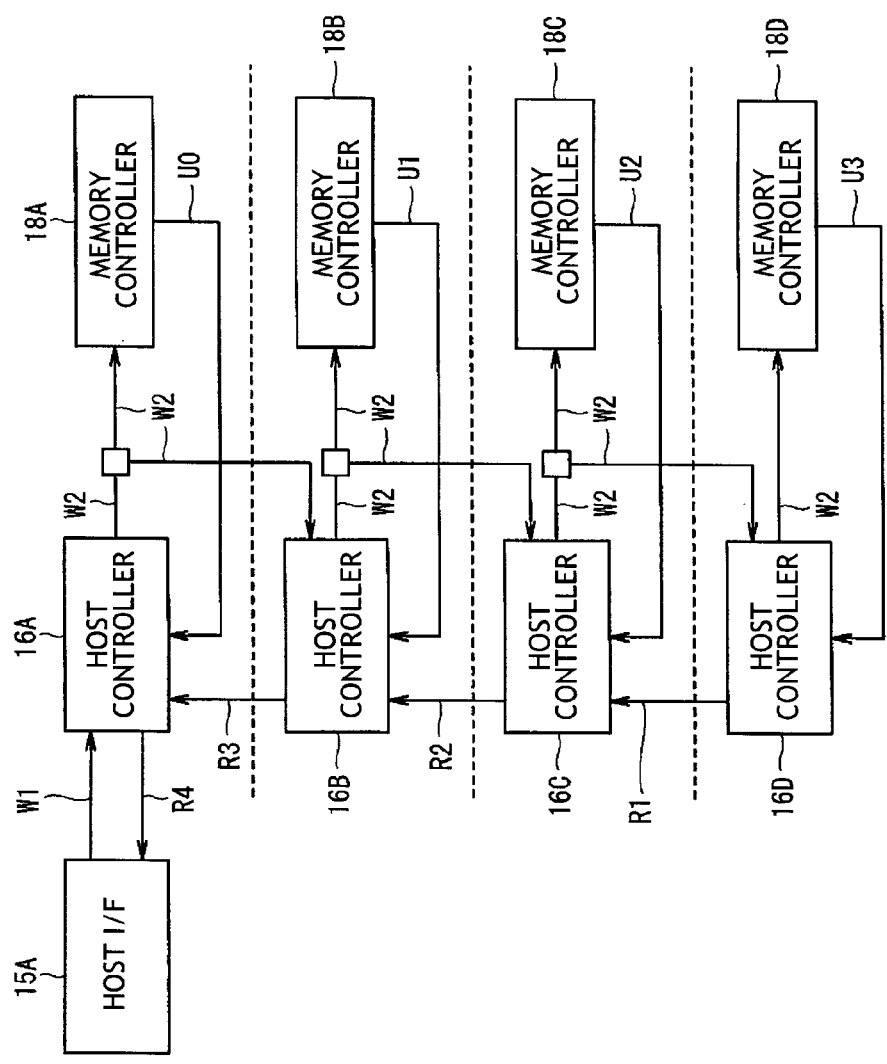
FIG. 7A is a view for illustrating flow of data transmitted and received in the data processing system according to the first exemplary embodiment of the invention.

Next, a flow of data transmitted and received in the data processing system 100A will be described with reference to FIGS. 7A and 7B.

(Writing of Data)

When the host 2 requests via the cable 102 the first storage device 1A to write data, the host controller 16A of the first storage device 1A receives write data W1 including data items D0 to D3 from the host 2 via the host I/F 15A.

Then, when the host controller 16A recognizes the write request as a request to write the data items D0 to D3 constituting the write data W1 into the storage devices 1A to 1D, respectively, the host controller 16A adds process information indicating the write request and address information indicating a write destination addresses of the data items D0 to D3 to the data items D0 to D3 to generate write data W2 including data items D'0 to D'3. Then, the host controller 16A converts the generated write data W2 into an optical signal by the E/O 160A-1 for transmission.

Then, the optical signal transmitted in the downstream direction from the host controller 16A is branched into two directions by the optical branch section 17A. Then, one of the branched signals is transmitted to the memory controller 18A, and the other is transmitted to the second storage device 1B via the optical transmission section 12A-1.

The optical signal transmitted to the memory controller 18A is converted into an electric signal by the O/E 181A. Then, the memory controller 18A performs a write process for the memory 19A based on the converted electric signal as the write data W2. Herein, the memory controller 18A judges that data to be written into the memory 19A is the data item D'0 among the data items D'0 to D'3 included in the write data W2, based on the process information indicating the write request and the address information. Thus, the memory controller 18A writes the data item D0 into the write destination address indicated by the address information.

Also, the optical signal transmitted to the second storage device 1B is converted into an electric signal by the O/E 161B-3 via the optical reception section 13B-2. Then, the host controller 16B converts the converted electric signal as the write data W2 into an optical signal by the E/O 160B-1, and transmits the converted optical signal to its own memory controller 18B and the third storage device 1C via the optical branch section 17B.

Then, the host controller 16C of the third storage device 1C, which has received the write data W2, transmits the write data W2 in the downstream direction in the same manner as described above. Furthermore, the host controller 16D of the fourth storage device 1D, which has received the write data W2, transmits the write data W2 to the memory controller 18D.

Then, the memory controllers 18B to 18D, which have received the write data W2, write the data corresponding to their own memories 19B to 19D into the write destination addresses, based on the data items D'0 to D'3 constituting the write data W2 When the same data is to be written into all the storage devices 1A to 1D from the host 2, the following procedure may be performed. That is, global addresses are added to the address information, and when the memory controllers 18A to 18D recognize the global addresses, the data items are written into their respective memories 19A to 19D.

(Reading of Data)

When the host 2 requests the first storage device 1A to read data, the host controller 16A receives a read destination address from the host 2 via the host I/F 15A. Then, the host controller 16A transmits a command C0 including process information indicating the read request and the read destination address in the downstream direction. Then, the memory controllers 18A to 18D provided in the first to fourth storage devices 1A to 1D receive the command C0.

Then, the memory controllers 18A to 18D recognize the received command C0 as the read request. Then, the memory controllers 18A to 18D read data items corresponding to the read destination addresses from the memories 19A to 19D, respectively, and transmit the read data items U0 to U3 to the host controllers 16A to 16D via the E/Os 180A to 180D, respectively.

Then, when the host controller 16D receives the read data U3 via the O/E 161D-2, the host controller 16D transmits in the upstream direction multiplex data R1 in which the read data U3 is allocated to a segment time slot allocated to itself according to the time slot allocation. Namely, the host controller 16D converts the electric signal as the multiplex data R1 into an optical signal by the E/O 160D-2, and transmits the optical signal to the third storage device 1C via the optical transmission section 12D-2.

Then, the host controller 16C performs time division multiplexing for (i) the multiplex data R1 received from the fourth storage device 1D via the optical reception section 13C-1 and (ii) the read data U2 received from the memory controller 18C. Then, the host controller 16C transmits the multiplex data R2 obtained by the time division multiplexing to the second storage device 1B via the optical transmission section 12C-2.

Then, the host controller 16B transmits to the first storage device the multiplex data R3 obtained by performing the time division multiplexing for the received multiplex data R2 and the read data U1, in the same manner as described above. Then, the host controller 16A transmits to the host I/F 15A the multiplex data R4 obtained by performing the time division multiplexing for the received multiplex data R3 and the read data U0.

Then, the host I/F 15A extracts the read data items U0 to U3 from the multiplex data R4 transmitted from the host controller 16A, and transmits the extracted data to the host 2 via the cable 102 as reply data to the read request from the host 2.

(3) Confirmation of Connection among the Storage Devices

During data are being transmitted and received among the first to fourth storage devices 1A to 1D in the manner described above, the host controllers 16A to 16D provided in the storage devices 1A to 1D periodically transmit connection maintaining signals to the upstream devices and the downstream devices with respect to the storage devices 1A to 1D. Also, the host controllers 16A to 16D periodically confirm if the host controllers 16A to 16D have received the connection maintaining signals transmitted from the upstream devices and the downstream devices.

For example, when the second storage device 1B has been removed from the rack 101 for some reason, the host controller 16A of the first storage device 1A detects that the host controller 16A has not received a connection maintaining signal from the host controller 16B for a given period. Then, the host controller 16A changes the state of the shutter 120A into the close state, and stops transmitting an optical signal to the second storage device 1B. Also, the host controller 16C of the third storage device 1C detects that the host controller 16C has not received a connection maintaining signal from the host controller 16B for a given period. Then, the host controller 16C stops the operation of the E/O 160C-2 to stop transmitting an optical signal to the second storage device 1B.

Also, when power supply to the second storage device 1B is stopped in removing the second storage device 1B from the rack 101, the second storage device 1B may stop transmitting optical signals to the first and third storage devices 1A and 1C. Alternatively, when the second storage device 1B is removed with the power supply being not stopped, the host controller 16B may detects that the host controller 16B has not received connection maintaining signals from both of the host controllers 16A and 16C for a given period, and stop transmitting optical signals to the first and third storage devices 1A and 1C.

(Modified Examples of Optical Transmission/Reception Sections)

Next, modified examples of a structure for propagating optical signals between the optical transmission section and the optical reception section will be described with reference to FIGS. 8A and 8B.

Figure 8A:
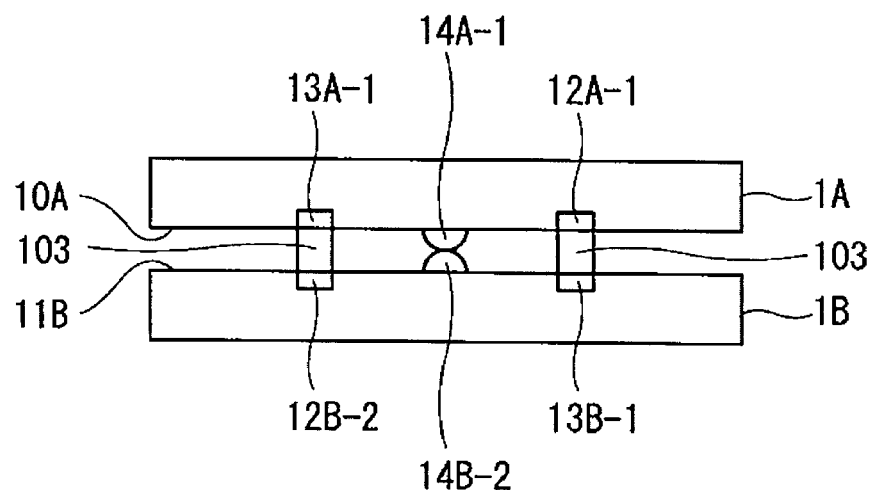
FIG. 8A is a section view of a storage device when a light guide member is provided between a optical transmission section and a optical reception section.

In FIG. 8A, a light guide member 103 such as an optical fiber is provided between the optical transmission section 12A-1 and the optical reception section 13B-2. With this configuration, when positions of the two storage devices 1A and 1B overlap each other, the optical transmission section 12A-1 and the optical reception section 13B-2 are connected through the light guide member 103. Also, another light guide member 103 is provided between the optical transmission section 12B-2 and the optical reception section 13A-1.

Figure 8B:
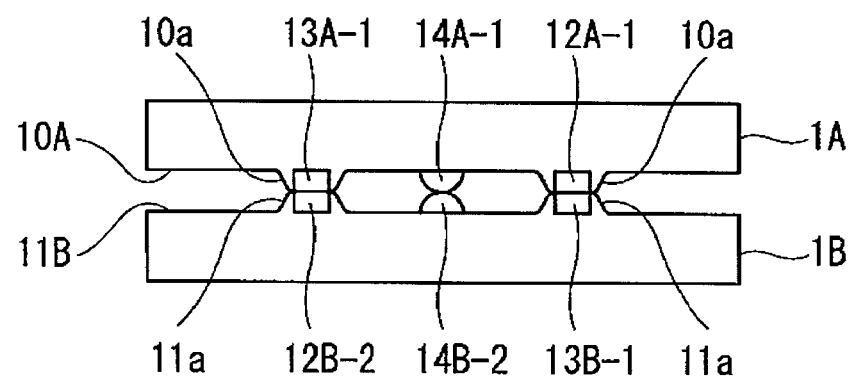
FIG. 8B is a section view of the storage device when a optical transmission section and a optical reception section are provided in convex portions.

In FIG. 8B, the optical transmission sections 12A-1 and 12B-2 and the optical reception sections 13A-1 and 13B-2 are disposed in convex portions provided on the bottom surface 10A and the top surface 11B. Namely, on the bottom surface 10A, the optical transmission section 12A-1 and the optical reception section 13A-1 are disposed in the convex portions 10a projecting toward the top surface 11B. On the tope surface 11B, the optical transmission section 13B-1 and the optical reception section 13B-2 are disposed in the convex portions 11a projecting toward the bottom surface 10A. With this configuration, the optical transmission sections 12A-1 and 12B-2 and the optical reception sections 13A-1 and 13B-2 opposing thereto can be connected directly, or the distances therebetween can be shortened.

Second Exemplary Embodiment

Figure 9:
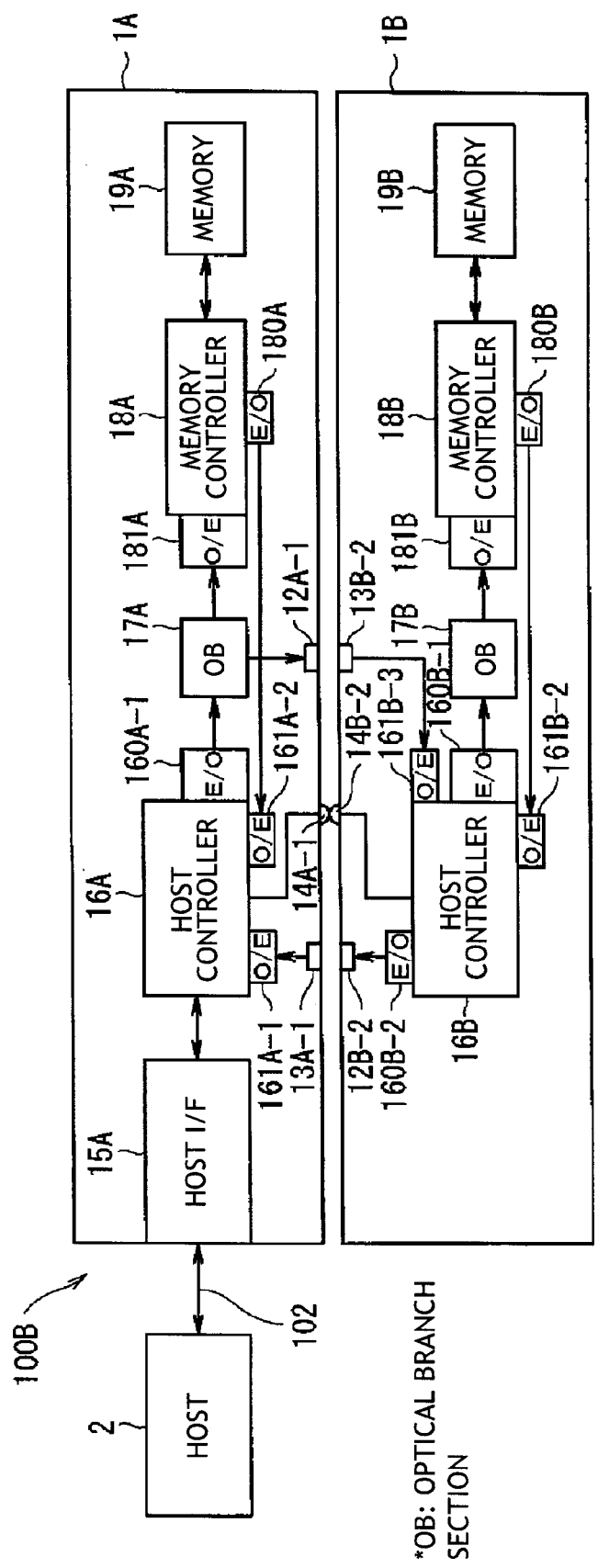
FIG. 9 is a block diagram showing one example of the schematic configuration of a data processing system according to a second exemplary embodiment of the invention.

FIG. 9 is a block diagram showing one example of the schematic configuration of a data processing system according to a second exemplary embodiment of the invention.

A data processing system 100B includes first and second storage devices 1A, 1B and a host 2. The second storage device 1B according to this exemplary embodiment is different from the second storage device 1B according to the first exemplary embodiment in that the second storage device 1B of this exemplary embodiment does not have a function of transmitting and receiving data between it and a downstream device thereof. The first storage device 1A of this exemplary embodiment is configured to be similar to that of the first exemplary embodiment.

Namely, the second storage device 1B includes a optical transmission section 12B-2, a optical reception section 13B-2, and a contact member 14B-2, which are provided on the top surface thereof. Also, the second storage device 1B includes a host controller 16B, a memory controller 18B, and a memory 19B. The host controller 16B performs an initialization process between the second storage device 1B and the first storage device 1A, and controls transmission and reception of data to and from the memory controller 18B and the first storage device 1A.

Third Exemplary Embodiment

Figure 10:
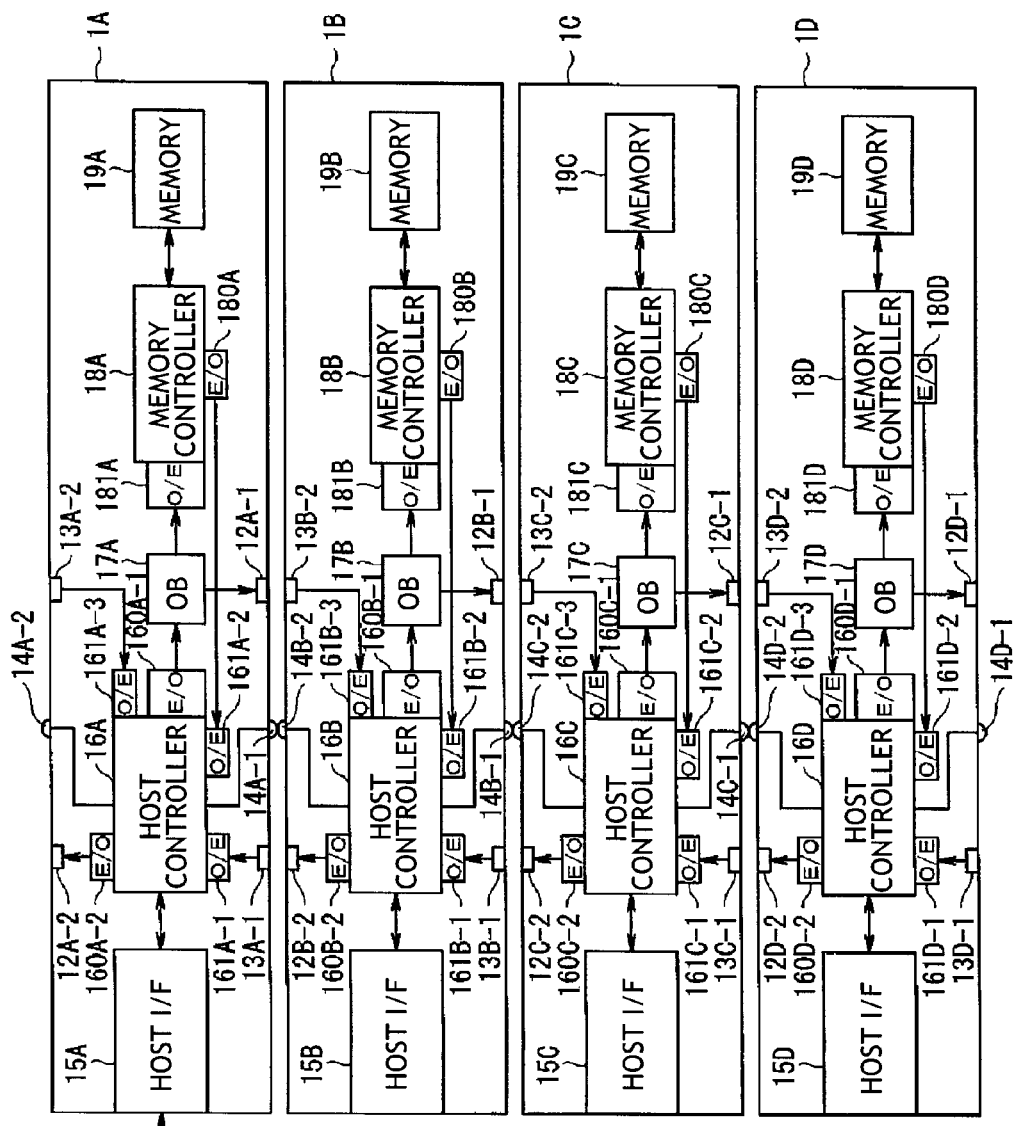
FIG. 10 is a block diagram showing one example of the schematic configuration of a data processing system according to a third exemplary embodiment of the invention.

FIG. 10 is a block diagram showing one example of the schematic configuration of a data processing system according to a third exemplary embodiment of the invention.

In the data processing system 100A according to the first exemplary embodiment, the configuration of the first storage device 1A is different from those of the other storage devices 1B to 1D. In contrast, in this data processing system 100C, the first to fourth storage devices 1A to 1D have the same configuration.

Namely, by taking the first storage device 1A as an example, the first storage device 1A includes a optical transmission section 12A-1, a optical reception section 13A-1, and a contact member 14A-1, which are provided on the bottom surface. Also, the first storage device 1A includes a optical transmission section 12A-2, a optical reception section 13A-2, and a contact member 14A-2, which are provided on the top surface. Furthermore, the first storage device 1A includes a host I/F 15A, a host controller 16A, an optical branch section 17A, a memory controller 18A, and a memory 19A. The other storage devices 1B to 1D are configured similarly.

Figure 11:
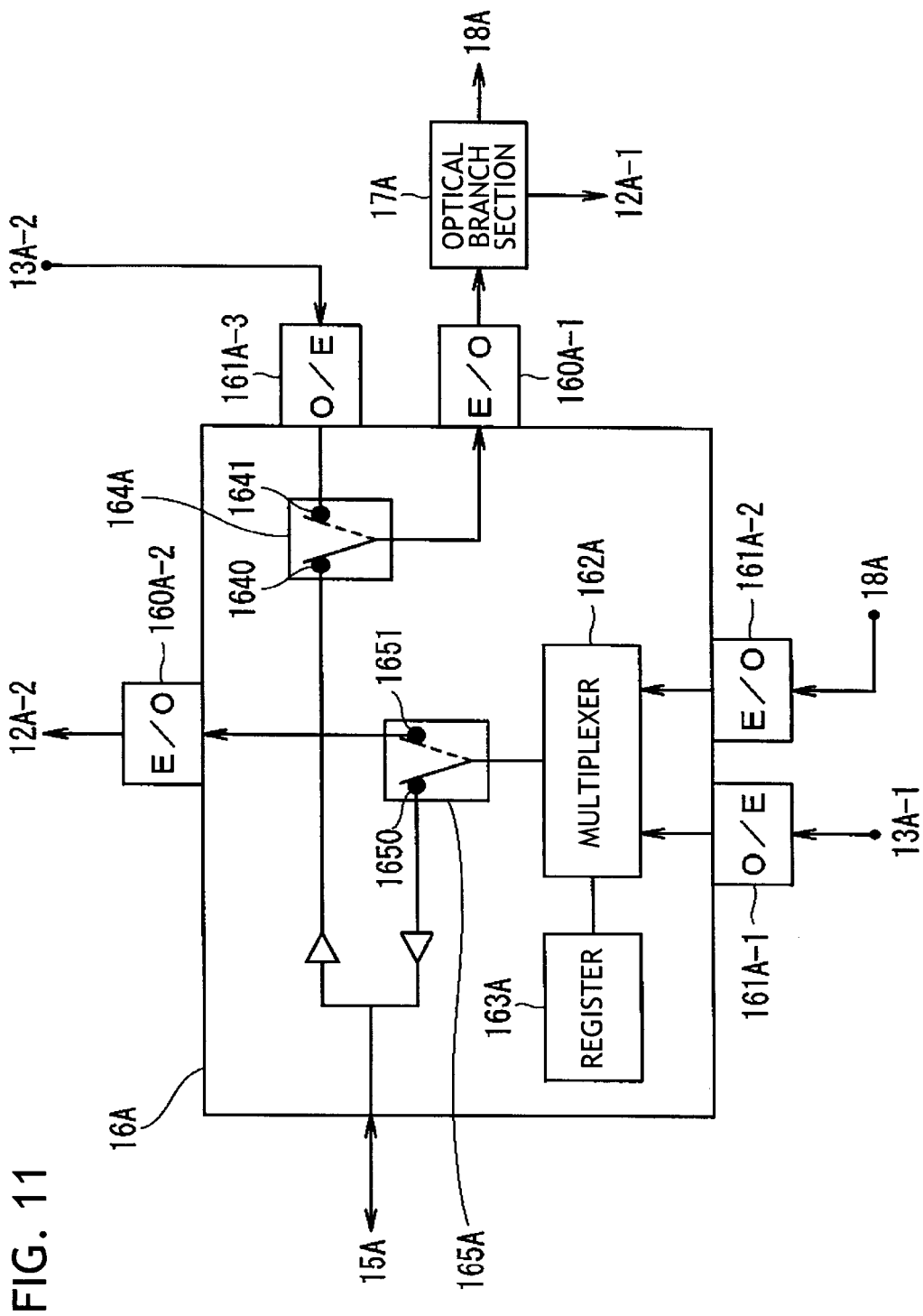
FIG. 11 is a block diagram showing one example of the schematic configuration of the inside of a host controller.

FIG. 11 is a block diagram showing one example of the schematic configuration of the inside of the host controller according to this exemplary embodiment. The host controller 16A includes a down switch 164A and an up switch 165A. The host controller 16A switches an internal signal process, using the down switch 164A and the up switch 165A, between a state where the host controller is connected to the host 2 via the host I/F 15A (host connection) and a state where the host controller 16A is connected to another storage device with the other storage device serving as an upstream device thereof (storage device connection).

When data is to be transmitted in the downstream direction, that is, to the memory controller 18A and the downstream device, the down switch 164A switches a transmission destination of the data to be transmitted. Namely, the down switch 164A has a host side connection portion 1640 to be connected for the host connection, and a storage device side connection portion 1641 to be connected for storage device connection. Thus, the host controller 16A determines either of the connection portion 1640 or 1641 to be connected during the initialization process.

Then, when the host controller 16A connects the down switch 164A to the host side connection portion 1640 based on the initialization process, the host controller 16A transmits data received from the host 2 via the host I/F 15A in the downstream direction. Whereas, when the host controller 16A connects the down switch 164A to the storage device side connection portion 1641, the host controller 16A transmits data received from the upstream device via the optical reception section 13A-2 in the downstream direction.

When data transmitted in the upstream direction from the memory controller 18A and the downstream device is received, the switch 165A switches a transmission destination of the received data. Namely, the up switch 165A has a host side connection portion 1650 to be connected for the host connection, and a storage device side connection portion 1651 to be connected for the storage device connection. The host controller 16A determines either the connection portion 1650 or 1651 to be connected during the initialization process.

Then, when the host controller 16A connects the up switch 165A to the host side connection portion 1650 based on the initialization process, the host controller 16A transmits the upstream-direction data to the host 2 via the host I/F 15A. Whereas, when the host controller 16A connects the up switch 165A to the storage device side connection portion 1641, the host controller 16A transmits the upstream-direction data to the upstream device via the optical reception section 12A-2.

In the example shown in FIG. 11, as a result of the initialization process, in the first storage device 1A, both of the down switch 164A and the up switch 165A are connected to the host side connection portions 1640 and 1650, respectively. In the second to fourth storage devices 1B to 1D, both the down switches 164B to 164D and the up switches 165B to 165D are connected to the storage device side connection portions 1641 and 1651, respectively.

Fourth Exemplary Embodiment

Figure 12:
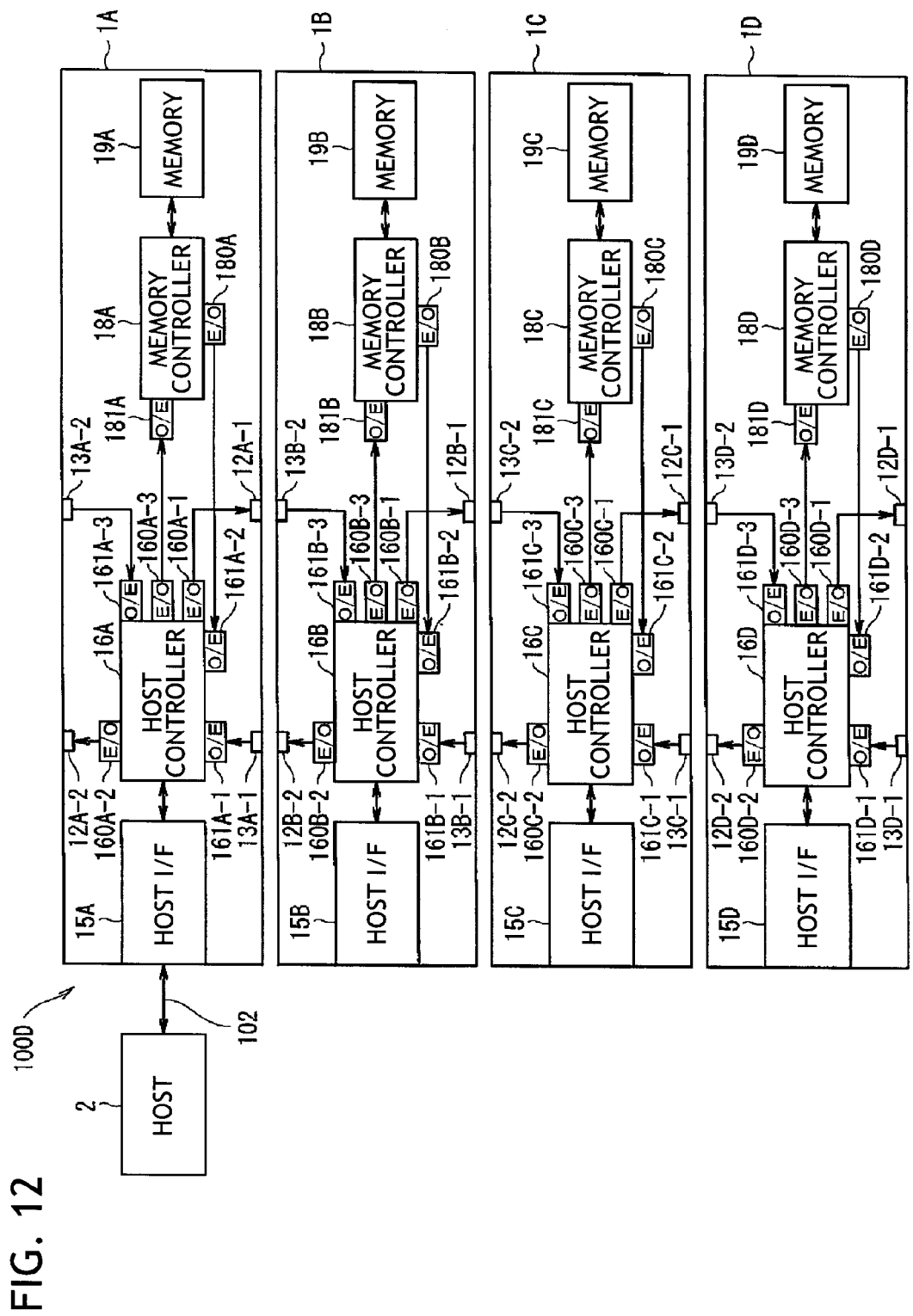
FIG. 12 is a block diagram showing one example of the schematic configuration of a data processing system according to a fourth exemplary embodiment of the invention.

FIG. 12 is a block diagram showing one example of the schematic configuration of a data processing system according to a fourth exemplary embodiment of the invention.

A data processing system 100D includes first to fourth storage devices 1A to 1D, and a host 2. The first to fourth storage devices 1A to 1D according to this exemplary embodiment are different from the first to fourth storage devices 1A to 1D according to the first exemplary embodiment in the configuration of transmission lines for transmitting data in the downstream direction from the host controllers 16A to 16D.

Specifically, the host controllers 16A to 16D include E/Os 160A-3 to 160D-3, respectively, in place of the optical branch sections 17A to 17D. The host controllers 16A to 16D and the memory controllers 18A to 18D are connected via the E/Os 160A-3 to 160D-3, respectively. Also, the host controllers 16A to 16D and optical transmission sections 12A-1 to 12D-1 are connected via E/Os 160A-1 to 160D-1, respectively.

The host controllers 16A to 16D control the E/Os 160A-3 to 160D-3, respectively. Thereby, only when the downstream devices are disposed, the host controllers 16A to 16D can transmit optical signals from the E/Os 160A-3 to 160D-3, respectively without having shutters 120A to 120D for the transmission sections 12A-1 to 12D-1.

Fifth Exemplary Embodiment

Figure 13:
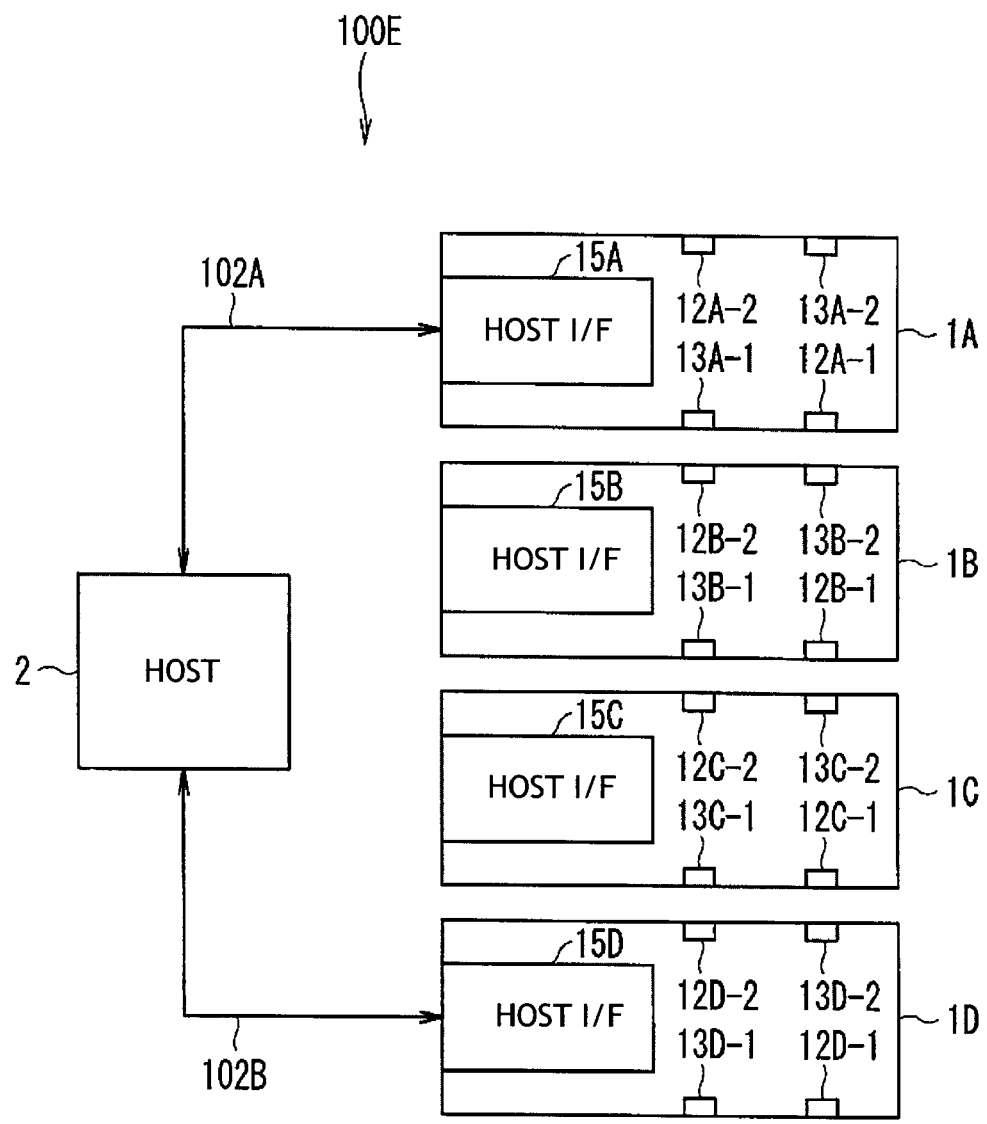
FIG. 13 is a block diagram showing one example of the schematic configuration of a data processing system according to a fifth exemplary embodiment of the invention.

FIG. 13 is a block diagram showing one example of the schematic configuration of a data processing system according to a fifth exemplary embodiment of the invention.

A data processing system 100E according to this exemplary embodiment includes first to fourth storage devices 1A to 1D and a host 2. The data processing system 100E has two systems of a system in current use and a spare system as transmission lines for establishing connection between the first to fourth storage devices 1A to 1D and the host 2. When a trouble occurs in the system in current use, the data processing system 100E switches from the system in current use to the spare system.

Namely, the host 2 is connected to the hosts I/Fs 15A and 15D provided in the first and fourth storage devices 1A and 1D via cables 102A and 102B as the transmission lines of the two systems. The first to fourth storage devices 1A to 1D of this exemplary embodiment are configured to be similar to the storage devices 1A to 1D according to the third and fourth exemplary embodiments. Also, the second and third storage devices 1B and 1C are not connected to the host 2. Thereof, the second and third storage devices 1B and 1C may be configured to be similar to the second storage device 1B according to the first exemplary embodiment.

When the transmission line of the cable 102A is employed as the system in current use, the first storage device 1A becomes the most upstream device. Thus, as with the first exemplary embodiment, a request from the host 2 is received by the host I/F 15A via the cable 102A. Based on the received request, the storage devices 1A to 1D write and read data.

When the first storage device 1A detects a trouble in transmission and reception of data performed by the system in current use, the first storage device 1A transmits a switching notification to the host 2 and the other storage devices 1B to 1D in order to switch the transmission line to the spare system. Thus, an initialization process for making the fourth storage device 1D to be the most upstream device is performed. Then, the transmission line for transmission and reception of data with the host 2 is switched to the spare system including the cable 102B and the host I/F 15D.

Sixth Exemplary Embodiment

Figure 14:
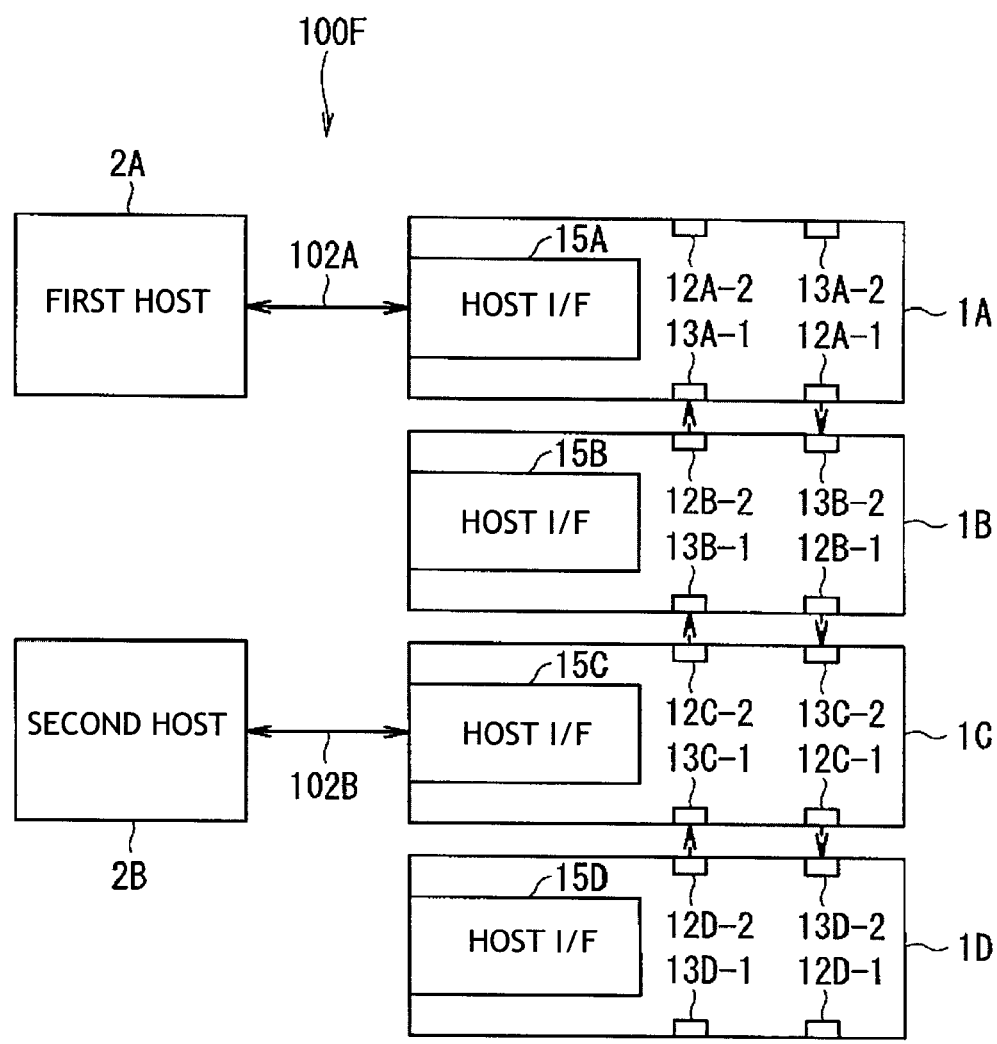
FIG. 14 is a block diagram showing one example of the schematic configuration of a data processing system according to a sixth exemplary embodiment of the invention

FIG. 14 is a block diagram showing one example of the schematic configuration of a data processing system according to a sixth exemplary embodiment of the invention.

The data processing system 100F includes first to fourth storage devices 1A to 1D and first and second hosts 2A and 2B. The first storage device 1A and the first host 2A are connected by a cable 102A. The third storage device 1C and the second host 2B are connected by a cable 102B. The first to fourth storage devices 1A to 1D are configured to be similar to the storage devices 1A to 1D according to the third and fourth exemplary embodiments. Alternatively, the second and fourth storage devices 1B and 1D are not connected to the host 2. Therefore, the second and fourth storage devices 1B and 1D may be configured to be similar to the second storage device 1B according to the first exemplary embodiment.

The first host 2A is connected to the first storage device 1A, so that transmission and reception of data are performed among the first to fourth storage devices 1A to 1D in response to a request from the first host 2A.

On the other hand, the second host 2B is connected to the third storage device 1C, so that transmission and reception of data are performed between the third and fourth storage devices 1C and 1D in response to a request from the second host 2B.

Other Exemplary Embodiments

It should be noted that the invention is not limited to the foregoing respective exemplary embodiments. Various modifications may be made within the scope without departing from the gist thereof. Furthermore, the constituent elements of the respective exemplary embodiments may be arbitrarily combined so long as the gist of the invention is not changed.

In the respective exemplary embodiments, for the E/O (electro-optic conversion section), for example, a light emitting element such as a semiconductor laser or a light emitting diode may be used. For the O/E (optic-electro conversion section), a light receiving element such as a semiconductor photodiode may be used. Furthermore, the memory controller and the host controller may be implemented by, for example, an electronic circuit including an integrated circuit such as FPGA.

What is claimed is:

1. A storage device comprising:
a storage section that stores data;
a first control section that controls reading and writing the data from and into the storage section;
a communication section that transmits and receives the data to and from a higher-level device via a first transmission line;
a second control section that transmits and receives the data to and from the first control section and the communication section; and
a wireless transmission and reception section that is provided to face a predetermined direction, and wirelessly transmits and receives data to and from another storage device provided in the predetermined direction under control of the second control section,
wherein if the second control section receives a request signal that has a predetermined pattern and is transmitted from said another storage device, the second control section starts to transmit and receive the data to and from said another storage device.

2. The storage device according to claim 1, wherein
the second control section includes an electro-optic conversion section that converts an electric signal as the data into an optical signal;
the first control section includes an optic-electro conversion section that converts the optical signal transmitted from the second control section into an electric signal; and
a second transmission line extending from the second control section to the first control section and the wireless transmission and reception section includes an optical branch line having an optical branch section that branches the optical signal transmitted from the second control section via the electro-optic conversion section in both of a direction toward the first control section and a direction toward the wireless transmission and reception section.

3. The storage device according to claim 1, further comprising:
a detection section that detects as to whether or not said another storage, device is disposed in a predetermined position where the data can be transmitted and received between the second control section and said another storage device, wherein
if the detection section detects that said another storage device is disposed in the predetermined position, the second control section causes the wireless transmission and reception section to start to transmit a wireless signal as the data.

4. A storage device comprising:
a storage section that stores data;
a first control section that controls reading and writing the data from and into the storage section;
a communication section that transmits and receives the data to and from a higher-level device via a first transmission line;
a second control section that transmits and receives the data to and from the first control section and the communication section; and
a wireless transmission and reception section that is provided to face a predetermined direction, and wirelessly transmits and receives data to and from another storage device provided in the predetermined direction under control of the second control section,
wherein if the second control section has not received a connection maintaining signal that has a predetermined pattern and is transmitted from said another storage device for a given period, the second control section stops transmitting and receiving the data to and from said another storage device.

5. A storage device comprising:
a storage section that stores data;
a first control section that controls reading and writing the data from and into the storage section;
a communication section that transmits and receives the data to and from a higher-level device via a first transmission line;
a second control section that transmits and receives the data to and from the first control section and the communication section; and
a wireless transmission and reception section that is provided to face a predetermined direction, and wirelessly transmits and receives data to and from another storage device provided in the predetermined direction under control of the second control section, wherein the second control section includes a storage circuit that stores control information regarding said another storage device, and the second control section updates the control information when arrangement of said another, storage device is changed.

6. A storage device comprising:

a storage section that stores data;

a first control section that controls reading and writing the data from and into the storage section;

a communication section that transmits and receives the data to and from a higher-level device via a first transmission line;

a second control section that transmits and receives the data to and from the first control section and the communication section; and a wireless transmission and reception section that is provided to face a predetermined direction, and wirelessly transmits and receives data to and from another storage device provided in the predetermined direction under control of the second control section, wherein the second control section allocates the data received from said another storage device and the data received from the first control section to segment time slots obtained by dividing a predetermined time period by a number equal to or more than a total number of the storage device and said another storage device, and the second control section transmits the plurality of data in an upstream direction toward the higher-level device.

7. A storage device comprising:

a storage section that stores data;

a first control section that controls reading and writing the data from and into the storage section;

a second control section that transmits and receives the data to and from the first control section;

a first wireless transmission and reception section that is provided to face a predetermined direction, and wirelessly transmits and receives data to and from a first other storage device provided in the predetermined direction under control of the second control section, and a second wireless transmission and reception section that is provided to face a direction opposite to the predetermined direction, and wirelessly transmits and receives data to and from a second other storage device provided in the direction opposite to the predetermined direction under the control of the second control section, wherein if the second control section receives a request signal that has a predetermined pattern and is transmitted from the first or second other storage device, the second control section starts to transmit and receive the data to and from said another storage device.

8. The storage device according to claim 7, further comprising:

a communication section that transmits and receives the data to and from a higher-level device via a transmission line, wherein the second control section transmits and receives the data to and from the first control section and the communication section.

9. The storage device according to claim 7, wherein the second control section includes an electro-optic conversion section that converts an electric signal as the data into an optical signal;

the first control section includes an optic-electro conversion section that converts the optical signal transmitted from the second control section into an electric signal; and a transmission line extending from the second control section to the first control section and the first wireless transmission and reception section includes an optical branch line having an optical branch section that branches the optical signal transmitted from the second control section via the electro-optic conversion section in both of a direction toward the first control section and a direction toward the first wireless transmission and reception section.

10. The storage device according to claim 7, further comprising:

a detection section that detects as to whether or not the first other storage device is disposed in a predetermined position where the data can be transmitted and received between the second control section and the first other storage device, wherein if the detection section detects that said another storage device is disposed in the predetermined position, the second control section causes the first wireless transmission and reception section to start to transmit a wireless signal as the data.

11. A storage device comprising:

a storage section that stores data;

a first control section that controls reading and writing the data from and into the storage section;

a second control section that transmits and receives the data to and from the first control section;

a first wireless transmission and reception section that is provided to face a predetermined direction, and wirelessly transmits and receives data to and from a first other storage device provided in the predetermined direction under control of the second control section, and a second wireless transmission and reception section that is provided to face a direction opposite to the predetermined direction, and wirelessly transmits and receives data to and from a second other storage device provided in the direction opposite to the predetermined direction under the control of the second control section, wherein if the second control section has not received a connection maintaining signal that has a predetermined pattern from at least one of the first and second other storage devices for a given period, the second control section stops transmitting and receiving the data to and from the at least one of the first and second other storage devices.

12. A storage device comprising:

a storage section that stores data;

a first control section that controls reading and writing the data from and into the storage section;

a second control section that transmits and receives the data to and from the first control section;

a first wireless transmission and reception section that is provided to face a predetermined direction, and wirelessly transmits and receives data to and from a first other storage device provided in the predetermined direction under control of the second control section, and a second wireless transmission and reception section that is provided to face a direction opposite to the predetermined direction, and wirelessly transmits and receives data to and from a second other storage device provided in the direction opposite to the predetermined direction under the control of the second control section, wherein the second control section includes a storage circuit that stores control information regarding the first and second other storage devices, and the second control section updates the control information when arrangement of the first or second storage device is changed.

13. A storage device comprising:

a storage section that stores data;

a first control section that controls reading and writing the data from and into the storage section;

a second control section that transmits and receives the data to and from the first control section;

a first wireless transmission and reception section that is provided to face a predetermined direction, and wirelessly transmits and receives data to and from a first other storage device provided in the predetermined direction under control of the second control section;

a second wireless transmission and reception section that is provided to face a direction opposite to the predetermined direction, and wirelessly transmits and receives data to and from a second other storage device provided in the direction opposite to the predetermined direction under the control of the second control section; and a communication section that transmits and receives the data to and from a higher-level device via a transmission line, wherein the second control section transmits and receives the data to and from the first control section and the communication section, the second control section allocates the data received from the first and second storage devices and the data received from the first control section to segment time slots obtained by dividing a predetermined time period by a number equal to or more than a total number of the storage device and the first and second other storage devices, and the second control section transmits the plurality of data in an upstream direction toward the higher-level device.

14. A storage device array comprising a first storage device; and a second storage device, wherein the first storage device includes a first storage section that stores data, a first control section that controls reading and writing the data from and into the first storage section, a first communication section transmits and receives the data to and from a higher-level device via a transmission line, a second control section that transmits and receives the data to and from the first control section and the first communication section, and a first wireless transmission and reception section that is provided to face a predetermined direction, and wirelessly transmits and receives data to and from the second storage device provided in the predetermined direction under control of the second control section, wherein if the second control section receives a request signal that has a predetermined pattern and is transmitted from said second storage device, the second control section starts to transmit and receive the data to and from said second storage device, and the second storage device includes a second storage section that stores data, a third control section that controls reading and writing the data from and into the second storage section, a fourth control section that transmits and receives the data to and from the third control section, and a second wireless transmission and reception section that is provided to face the first storage device, and wirelessly transmits and receives data to and from the first storage device under control of the fourth control section.

15. A data processing system comprising:

a higher-level device that processes data;

a first storage device; and a second storage device, wherein the first storage device includes a first storage section that storing data transmitted from the higher-level device, a first control section controls reading and writing the data from and into the first storage section, a first communication section transmits and receives the data to and from the higher-level device via a transmission line, a second control section that transmits and receives the data to and from the first control section and the first communication section, and a first wireless transmission and reception section that is provided to face a predetermined direction, and wirelessly transmits and receives data to and from the second storage device provided in the predetermined direction under control of the second control section, wherein if the second control section receives a request signal that has a predetermined pattern and is transmitted from said second storage device, the second control section starts to transmit and receive the data to and from said second storage device, and the second storage device includes a second storage section that stores data, a third control section that controls reading and writing the data from and into the second storage section, a fourth control section that transmits and receives the data to and from the third control section, and a second wireless transmission and reception section that is provided to face the first storage device, and wirelessly transmits and receives data to and from the first storage device under control of the fourth control section.

* * * * *